United States Patent [19]

Demerest

[11] Patent Number: 5,614,228
[45] Date of Patent: Mar. 25, 1997

[54] APPARATUS FOR PRODUCING A HEAT SET ARTICLE OF THERMOFORMED POLYETHYLENE TEREPHTHALATE

[75] Inventor: A. Edward Demerest, Middlesex, N.J.

[73] Assignee: Therma-Plate Corporation, Piscataway, N.J.

[21] Appl. No.: 849,283

[22] Filed: Mar. 10, 1992

Related U.S. Application Data

[62] Division of Ser. No. 165,370, Mar. 1, 1988, Pat. No. 5,106,567, which is a continuation of Ser. No. 802,540, Nov. 27, 1985, abandoned.

[51] Int. Cl.⁶ ............................................. B29C 51/00
[52] U.S. Cl. ........................... 425/326.1; 264/177.19; 264/210.5; 425/384; 425/388; 425/403.1
[58] Field of Search .............................. 425/325, 326.1, 425/384, 387.1, 388, 403.1; 264/210.1, 237, 177.17, 310, 327, 503, 519, 553, 571, 177.19, 210.5

[56] References Cited

U.S. PATENT DOCUMENTS

| | | | |
|---|---|---|---|
| 3,314,110 | 4/1967 | Missbach | 425/388 |
| 3,381,445 | 5/1968 | Vogt | 425/261 |
| 3,429,854 | 2/1969 | Siggel et al. | 264/292 |
| 3,496,143 | 2/1970 | Siggel et al. | 264/292 |
| 3,518,725 | 7/1970 | Donofrio | 425/388 |
| 3,676,537 | 7/1972 | Winstead | 264/210.2 |
| 3,887,320 | 6/1975 | Erlewine et al. | 425/388 |
| 3,931,383 | 1/1976 | Erlewine et al. | 264/210.1 |
| 4,039,609 | 8/1977 | Thiel et al. | 264/171 |
| 4,061,706 | 12/1977 | Duffield et al. | 425/388 |
| 4,127,631 | 11/1978 | Dempsey et al. | 264/553 |
| 4,234,530 | 11/1980 | Thiel et al. | 264/522 |
| 4,250,129 | 2/1981 | Winstead | 264/210.1 |
| 4,284,396 | 8/1981 | Thissen et al. | 425/388 |
| 4,388,356 | 6/1983 | Hrivnak et al. | 428/35 |
| 4,413,964 | 11/1983 | Winstead | 425/326.1 |
| 4,420,300 | 12/1983 | Winstead | 425/388 |
| 4,469,270 | 9/1984 | Gartland | 264/522 |
| 4,563,320 | 1/1986 | Morgan | 264/297.1 |
| 4,582,665 | 4/1986 | Jabarin | 264/522 |
| 4,722,820 | 2/1988 | Flecknoe-Brown | 425/388 |

FOREIGN PATENT DOCUMENTS

| | | | |
|---|---|---|---|
| 88625 | 9/1983 | European Pat. Off. | 264/533 |
| 1906430 | 8/1970 | Germany | 425/388 |
| 102372 | 8/1979 | Japan | 264/519 |

OTHER PUBLICATIONS

A. Modern Plastic Special Report, Modern Plastics, Aug. 1985, p. 43.
Information Sheet regarding Melinar Pet (Polyethylene Terephthalate) provided by Imperial Chemical Industries PLC.
Thermoforming Heat Set Pet Containers Using Goodyear Resins, Information Sheet from Goodyear Chemical.
"Tenite" Pet Thermoplastic Polyester 5132 for Ovenable Trays.
"These all-plastic rigid containers Offer High Barrier", Food Packaging, Feb. 1985, pp. 67–68.
Modern Plastics, Jul. 1985, p. 27.
Reactive Processing: New Era of Innovation Begins in Resin Production (by Joseph A. Sneller), Modern Plastics, Jul. 1985, p. 56 et seq.

(List continued on next page.)

Primary Examiner—C. Scott Bushey
Attorney, Agent, or Firm—Curtis, Morris & Safford, P.C.

[57] ABSTRACT

Apparatus for producing an ovenable shaped article of polyethylene terephthalate wherein the polyethylene terephthalate is heated to a temperature in which it is in a thermoformable plastic state, formed as a sheet, locally cooled to form a skin on the surface of the sheet whale maintaining the sheet as a whole in the thermoformable plastic state and vacuum forming the shaped article within cavities on a rotating drum. The cavities are additionally provided with controlled heaters to heat the shaped article to impart thereto a degree of crystallinity of at least about 20% and the sheet is laterally and longitudinally tensioned after removal from the drum to prevent distortion.

5 Claims, 3 Drawing Sheets

OTHER PUBLICATIONS

Blow Molded Engineering Plastics Hold Key to Middle Volume Markets (by George Smoluk), Modern Plastics, Jul. 1985, p. 61 et seq.

"Unpretentious Convenience", Packaging News & Trends, Packaging, Mar. 1985, p. 10 et seq.

Dual–Oven Paperboard Tray Promotes Pizza Palatability, Packaging, Feb. 1985, p. 83.

CPET Trays.

Campbell's Plastics Center: Where Food and Plastics Explore the Future, Field Report, Food Engineering.

APPARATUS FOR PRODUCING A HEAT SET ARTICLE OF THERMOFORMED POLYETHYLENE TEREPHTHALATE

This application is a division of application Ser. No. 165,370, filed Mar. 1, 1988 now U.S. Pat. No. 5,106,567, which is a continuation of Ser. No. 802,540, filed Nov. 27, 1985, now abandoned.

FIELD OF THE INVENTION

This invention relates to a thermoforming method and apparatus for producing shaped thermoplastic articles, and further to the articles themselves.

BACKGROUND OF THE INVENTION

Heretofore, the development of polymeric containers for the storage of food stuffs and the like has been a focus in the art. Some of the more popular products of this sort which have been developed for the packaging of food and beverages include polyester-coated paper board for ovenable trays, soft drink carbonated beverage bottles, mouthwash containers, thermoformed blister packs for the packaging of cold cuts, and films in various food wrap applications.

Plastics previously utilized for hot-fill applications have generally been subject to one or more shortcomings such as lack of acceptable strength, the necessity of using special processing techniques entailing a substantial increase in manufacturing costs, or the requirement of using materials which are too expensive to be cost-competitive. Particularly as to the use of polyester and hot-fill food applications, it has been observed that there are two principal problems. Those are (a) if biaxially oriented, polyester containers undergo considerable shrinkage when heated to temperatures at or near their glass transition temperatures, and (b) unoriented polyester containers undergo a crystalline transition at elevated temperatures used in hot-fill food applications causing the containers to become opaque and brittle.

One alternative which has been offered as a possible solution is the making of hot-fill containers of polyethylene terephthalate ("PET"). This technique typically includes the steps of heating an amorphous sheet of unoriented PET, drawing the sheet with a male plug to obtain biaxial orientation in the PET material, transferring the drawn sheet from the male plug to a heated female cavity for the purpose of molding and heat setting the PET sheet, i.e., imparting a degree of crystallinity desired in view of the intended end use. The PET is then allowed to shrink back onto the male plug for cooling to a temperature below its glass transition temperature. See U.S. Pat. No. 4,388,356 granted to Hrivnak, et al. on Jun. 14, 1983. It is said in that patent that the following of the aforementioned technique permits production of a clear and non-brittle article of PET.

However, the technique mentioned in the preceding paragraph is also subject to serious shortcomings. As is clear from the above-identified patent, the amorphous PET sheet utilized is theretofore produced at elevated temperature by extrusion and calendaring. The PET sheet is conventionally allowed to cool and it is presumably stored (e.g. in inventory) until such time as it is to be used in the production of a PET container. In order to carry out the patented process the sheet is then reheated, for instance by indexing through a temperature-controlled oven, to bring it into the thermoformable plastic state. Only after reheating of the PET sheet is it then molded and further heated to convert the amorphous PET to a crystalline state; the degree of crystallinity is the result of the correlative effects of time and temperature (although it should be noted that by conventional inclusion of a nucleating agent in the PET, e.g., 2–3 wt. % of an olefin, the time-at-temperature necessary for crystallization is significantly reduced). Problems in implementing this technology stem from the fact that it entails a first heating of the PET material to render it extrudable, and then a reheating of extruded PET at the time of its formation into a container or the like. That is to say, the conventional technique is disadvantageous due to the significant energy wastage, and thus increased cost, which is inherent in the reheating of the PET to render it thermoformable for molding. The conventional technique is further disadvantageous in that reheating requires impractically difficult control of reheating oven temperatures in order to avoid overheating of the PET sheet before mold contact. Such overheating is undesirable because it introduces a degree of initial crystallization prior to heat setting than can be tolerated, for the reason that excessive crystallization unacceptably reduces the impact resistance of the ultimately thermoformed PET product. Additionally, it would seem that in using the technique claimed in the patent—forcing PET into a female cavity with a male plug—it would be difficult to control the respective dimensions of the male plug and female cavity during heating, thereby leading to likely scraping or rubbing of the plug against the molded PET (due to the close tolerances required) in all but the smallest molding cavity arrangements. These are significant drawbacks.

Accordingly, prior developments leave much to be desired.

OBJECTS AND STATEMENT OF THE INVENTION

It is an object of the present invention to provide a shaped polyethylene terephthalate article, having a uniform degree of crystallinity, and high impact strength and dimensional stability and a process and apparatus for making same.

It is a second object of this invention to provide a shaped PET article produced without a reheating step which prematurely imparts undesirable crystallinity before heat setting, and a process and apparatus for making that article.

It is another object of this invention to provide ovenable PET articles at relatively low cost, with a minimum of inconvenience, and a simple rotary process and apparatus for making those articles. This is to be contrasted especially with practice of conventional thermoforming technology which utilizes many "oscillating" operations, such as indexing of the PET sheet and molded PET, and opening and closing of the mold apparatus.

It is a further object of this invention to provide a biaxially oriented, impact resistant, shaped PET article and a process and apparatus for making same.

It is still another object of the present invention to provide shaped PET articles of uniform crystallinity and impact resistance, both within each such article and from article to article, and a process and apparatus for making such articles.

These objects are satisfied by the present invention.

In one of its aspects, the invention is in an article of manufacture comprising an ovenable shaped article formed of polyethylene terephthalate having a degree of crystallinity of at least 20%, said crystallinity being substantially uniform over the whole of the container.

In another of its aspects, the invention is in a method of forming an ovenable shaped container of polyethylene terephthalate, which comprises the steps of forming polyethylene terephthalate into an amorphous sheet at a temperature at which the terephthalate is in a thermoformable plastic state; while polyethylene terephthalate of said sheet is still in a thermoformable plastic state, forming at least a portion of said sheet into a shaped article; subjecting the shaped polyethylene terephthalate to a temperature for a time effective to impart to the terephthalate a degree of crystallinity of at least 20%.

In yet another aspect, the invention relates to an ovenable container produced by the process described in the preceding paragraph.

In still another of its aspects, the invention is an apparatus for producing an ovenable shaped article of polyethylene terephthalate, which comprises means for heating the polyethylene terephthalate to a temperature at which it is in the thermoformable plastic state; means for forming the polyethylene terephthalate in its thermoformable plastic state into a sheet; means for locally cooling a surface of said sheet of polyethylene terephthalate still in its thermoformable plastic state, thereby to form a skin on said surface while maintaining the sheet as a whole in the thermoformable plastic state; means for forming polyethylene terephthalate material of said sheet, said material still being in said thermoformable plastic state, into a shaped article; means for additionally heating the polyethylene terephthalate making UP said shaped article, while it is still in the thermoformable plastic state, to impart thereto a degree of crystallinity of at least about 20%.

Numerous advantages accrue with practice of the present invention. Because PET material is in the thermoformable plastic state throughout the sheet-formation and shaped article-formation operations, without utilization of a reheating step, the heat energy which would ordinarily be wasted in carrying out such reheating step is eliminated. This leads to self-evident cost economies. Additionally, because it is not necessary to reheat PET prior to forming it into a shaped article there is an elimination of the necessity for extensive, difficult and commercially impractical control of reheating in order to avoid prematurely imparting unwanted crystallinity prior to article-formation. Any excessive crystallization which would occur with use of prior and conventional techniques is minimized or eliminated since with the present invention there is only one heating of the PET material. Furthermore, since with the present invention, the degree of crystallinity both throughout each shaped article and from article to article is uniform, impact resistance is also more uniform and reproducible. Additionally, from an apparatus standpoint, because the present invention lends itself to a simple formation operations in certain embodiments, complicated hydraulic and pneumatic valving for carrying out the aforementioned oscillating operations of conventional equipment can be eliminated.

The present invention, including further objects and features thereof, will be more fully understood from the following description of certain preferred embodiments, when read with reference to the accompanying drawings.

DESCRIPTION OF CERTAIN PREFERRED EMBODIMENTS

Figure 1:
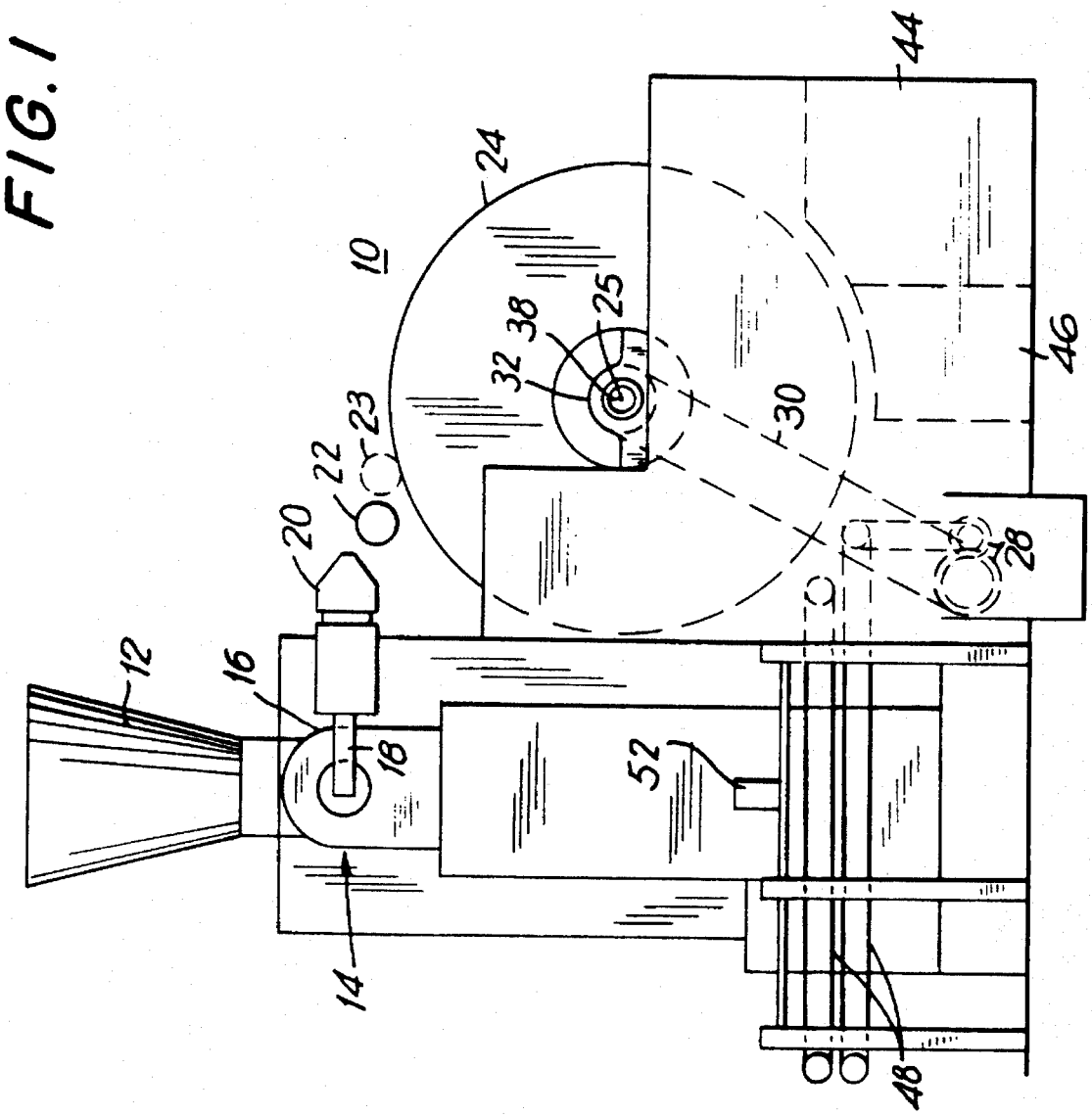
FIG. 1 is a side elevational view of apparatus for forming articles of PET in accordance with the claimed invention.

It is a central feature of the present invention that the formation of a shaped article of PET is accomplished without the need for a reheating step to bring the PET back to its thermoformable plastic state after the formation of PET into a sheet but prior to its shaping and heat setting. Because the necessity to reheat cold PET sheet prior to the article-forming step is eliminated, so are the cost of such reheating and the danger of prematurely imparting undesirable crystallization to the amorphous PET material of the sheet, all of which leads to the substantial advantages of the invention. Accordingly, preferred embodiments of the present invention are practiced with the foregoing in mind, and any additional process and apparatus refinements described herein are implemented such that the PET material as a whole effectively remains in the thermoformable plastic state between sheet-formation and shaped article-formation to eliminate the need for unwanted reheating as discussed above.

Although the invention's practice is not necessarily limited to utilization of crystallizable polyethylene terephthalate "PET" (PET which is not crystallizable is also suitably used in some adaptations to form clear container covers for baked goods, etc.) embodiments employing that crystallizable material particularly exploit the advantages of the invention. Its use permits production of shaped articles having good dimensional stability. Such shaped articles are particularly suitable for use in hot-fill packaging processes, or as receptacles for heating or reheating materials stored therein. With the present invention, crystallizable PET can be formed into articles which are "dual ovenable", i e sufficiently resistant to the effects of temperature etc. to be usable in both a conventional oven and a microwave oven. Typically, their heat distortion temperature is at least 420° F., for instance 420°–450° F.

A profile of the physical states of PET is set forth in the following table.

| PHYSICAL STATES OF PET | | | | |
|---|---|---|---|---|
| State | Description | % Crystallinity | Tg °C. | Uses/ Appearance |
| Amorphous | — | 0–5 | 70 | blister pack/clear |
| Oriented Amorphous | strain,induced rod-like crystals | 5–20 | 73 | beverage bottles/ clear |
| Crystalline | heat-induced spherical crystals | 25–35 | 81 | food trays/ opaque |
| Oriented Crystalline | strain induced, rod like crystals, then heat induced, more perfect rod-like crystals | 35–45 | 125 | hot fill contains/ clear |

Another important property of PET is its intrinsic viscosity ("IV"). The higher the IV of PET, the higher will be its impact resistance, and the more extensive the forming treatment (e.g. the higher the temperature) will be that is necessary to process it. Consideration of IV is of particular importance from the standpoint that practicing of certain embodiments of the invention reduces the amount of scrap material trimmed or reground from the PET during processing. The scrap material, when reintroduced to the PET feedstock (as is typical in commercial manufacturing) lowers the IV, which correlates with a lower of impact resistance of articles made from that feedstock. With the invention this lowering can, thus, be reduced.

Polyethylene terephthalate polymer is conventionally prepared by reacting either terephthalic acid or its lower alkyl ester, dimethylterephthalate, with ethylene glycol. The resultant glycol ester is then polymerized in known manner to a high molecular weight product such that the polyester produced has an intrinsic viscosity ranging from about 0.5 to about 1.1 and preferably from about 0.7 to about 1.0 (as measured in a 60/40 by volume mixed solvent of phenol/ tetrachloride solvent of phenol/tetrachloroethane at 30° C.).

At room temperature, say 25° C. (77° F.) amorphous PET is a hard, clear solid. Its glass transition temperature is about 70° C. (158° F.). The "glass transition temperature" as used herein refers to that temperature at, or temperature range in, which a change in slope appears in the volume versus temperature curve for the polymer. The glass transition temperature defines a point or region below which the polymer exhibits a glassy characteristic and above which it exhibits a rubbery characteristic. Accordingly, at and just above the glass transition temperature, PET is soft and pliable. At about 90° C. (194° F.) PET is tacky, and at 100° C. (212° F.) crystallization begins. By the time 135° C. (275° F.) has been reached crystallization of PET is proceeding rapidly, and the material becomes opaque. The melt point of PET occurs at about 260° C. (500° F.). This temperature profile of the behavior of PET is important to keep in mind during the following discussion.

A shaped PET article, for example container, of the present invention is preferably made in the following manner.

First PET is extruded and formed into a substantially amorphous sheet. In preparation for extrusion and sheet formation, the PET material is first dried, for instance for four hours at about 170° C. (338° F.). Generally, about one cubic foot of air at the above mentioned temperature per pound of PET material, per minute, is passed through pellets of PET. The air typically has a dew point of –20° F. to –40° F. The moisture content of the PET material is advantageously reduced to less than 0.005%. The dried pellet is then placed in an extruder and associated die apparatus, in order to for a sheet of amorphous PET. Conventional extrusion apparatus, such as a screw extruder, and conventional die equipment such as a flat sheeting die, are suitable; however, other suitable types of extrusion and die equipment can also be used. In order to render the PET material sufficiently malleable for extrusion and sheet-formation, it is heated to a temperature near or above its melt point. Typically, the PET is formed into a melt of temperature about 550°–560° F. The screw is set to rotate at an appropriate speed, such as 45 revolutions per minute and it pushes the material fed to it through the barrel of the extruder and into a flat sheeting die at the end of the barrel. The flat sheeting die is generally of adjustable gauge.

In the sheeting die, the extruded material is formed into a sheet configuration of desired thickness, for example 0.015 gauge. Then, while still at temperature sufficiently high to keep it in a thermoformable plastic state, the sheet is fed to one or more chilled rolls. The purpose of this operation is to form on a surface of the sheet a skin of cooled PET, while maintaining the balance of the sheet, and the sheet as a whole, in its thermoformable plastic state—in order to avoid the necessity of reheating. The roll or rolls are maintained at a temperature which is effective to cause formation of that skin, but it is not so low as to cause the balance of the sheet to lose its thermoformability, typically 160° F. Appropriate chilling can be induced through the use of just one roll, but two or more rolls are desirable if the sheet is over 0.02 gauge.

The PET sheet is in the amorphous state both before and after its passage over the chilled roll (or the chilled rolls). Accordingly, the degree of crystallinity of the PET sheet is normally less than 10%, typically from 0 to 5%.

Following its contacting with the chill roll(s), the sheet is formed into the desired shaped article. During this operation PET material of the sheet is kept in its thermoformable plastic state, again so that there is no need to reheat the PET material prior to article-formation. In this respect, it can be readily appreciated that the operations of sheet formation and subsequent formation into a container or other article are parts of a unitary processing scheme which eliminates the need for the conventional reheating step. This is a central feature of the present invention, and it is through this measure that significant advantages are achieved. That is to say, by maintaining the PET material in its thermoformable plastic state and eliminating the reheating step, overheating with uncontrolled crystallization during the conventional reheating operation is avoided. This ensures the avoidance of a loss of impact strength due to excessive crystallization, and of non-uniform crystallization in the article formed from the PET.

The article-forming step is advantageously accomplished by feeding the PET sheet onto a forming drum. The drum is provided with female cavities in its generally cylindrical sheet-receiving surface. The sheet is generally drawn into the female cavity by evacuating it, preferably through ports located in the lower end of the female cavity. Each cavity is heated such that its inner surface is maintained at a sufficiently high temperature to cause crystallization in the PET material in contact with it. The time at temperature required to impart the desired degree of crystallinity is a function of the heating temperature and the rate of rotation of the forming drum (it should be kept in mind that the time-at-temperature necessary is significantly reduced by incorporation of a nucleating agent in conventional fashion). The relationship between the amount of heat energy to which the PET is subjected during forming and the degree of crystallinity imparted is readily determinable by the worker of ordinary skill in the art without undue experimentation, once he is equipped with the teachings herein. By virtue of this forming step the polyethylene terephthalate is oriented, biaxially oriented if desired, to impart the intended properties to the shaped article.

In a highly advantageous embodiment of the invention, a tensioning force is applied to the PET material (a sheet with the desired article, e.g., a container, formed integrally therein) as that material is taken off the rotary drum. The force need be no greater than necessary to tension the PET material in both the directions of sheet transport (longitudinally) and the direction transverse that of sheet transport (laterally) in order to prevent the sheet from warping or otherwise distorting during its cooling to an impact resistance solid.

After the desired shapes are formed in the PET sheet and the sheet including those shapes is disengaged from the rotary drum means, the sheet is ultimately conveyed to a station at which the shaped articles can be recovered. This is ordinarily accomplished by an automated cutting operation. The containers are then appropriately inventoried for subsequent use, shipment to customers, etc.

Following of the manufacturing process as aforesaid yields an article, for example a container, of PET which exhibits good dimensional stability, is sealable, and has a high impact resistance (due to biaxial orientation, which renders it useful in hot-filled packaging applications and as a container for reheating).

These, and other more specific embodiments of the present invention, are further described with reference to several annexed figures of drawing as follows.

Figure 2:
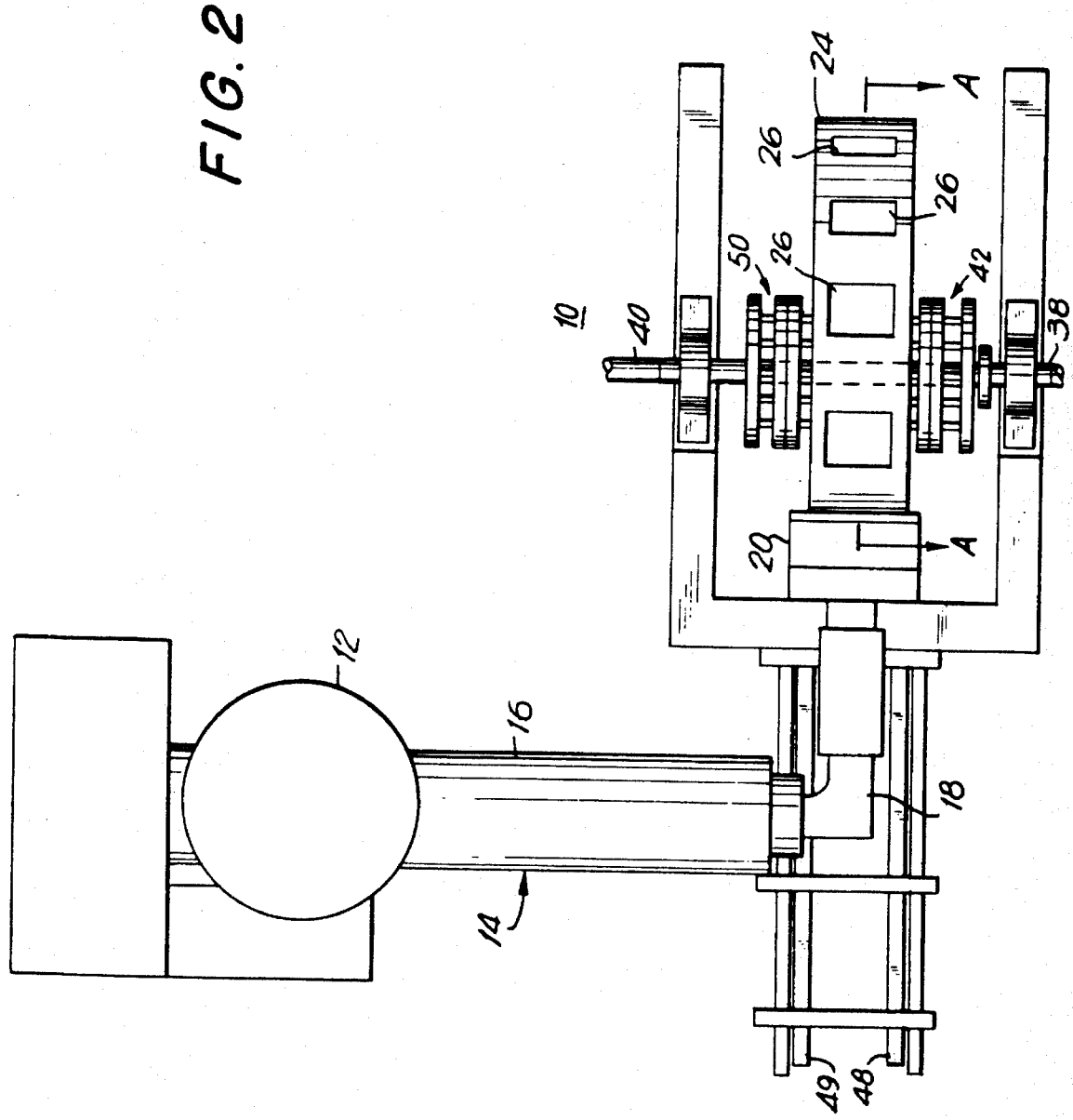
FIG. 2 is a top plan view of the apparatus shown in FIG. 1.

In FIGS. 1 and 2 there is shown a system 10 for accomplishing the objectives of the invention. A hopper 12 is mounted on an extruder 14. PET material, typically in the form of pellets, is fed into the hopper, where it is air dried (by apparatus not shown for the sake of simplicity) to a moisture content of about 0.005%. The PET material is then fed from the hopper into extruder 14, which is a screw extruder the screw of which is housed in barrel 16. The extruder has a 24:1 length to diameter ratio, and the diameter of the barrel is determined by the output required. The output of the barrel is conducted by conduit 18 to flat sheeting die 20, which has an adjustable gauge so that the thickness of polyethylene terephthalate extrudate feed can be varied.

As the sheet emerges from die 20, it is moved across a temperature-controlled roll 22. Alternatively, the sheet may be moved through a double-roll arrangement (second roll 23 of which is shown in phantom in FIG. 1), depending on the thickness of the sheet (alternatively, the rolls could be oriented vertically of one another). Generally, a double-roll system is utilized for sheet of over 0.02 gauge. The temperature of the single or double-roll device is appropriately set as described previously herein to cause formation of a skin on the PET sheet. However, it is central to the present invention that the overall temperature of the PET material does not decrease to the extent that the sheet as a whole is no longer in the thermoformable plastic state. Rather, it is essential to the invention that the PET material is maintained at or above such temperature throughout its processing to the final desired shape in order to eliminate the necessity of a reheating step.

Once the PET sheet has passed the temperature controlled roll system it is fed to drum 24. Drum 24 is rotatable about its longitudinal axis 25, and is driven by a conveyor drive system comprising drive chain 30 and gears 28. The drive chain engages unit 32, for example, a sprocket and thus effects rotation of drum 24 when such drive chain is moved.

Figure 3:
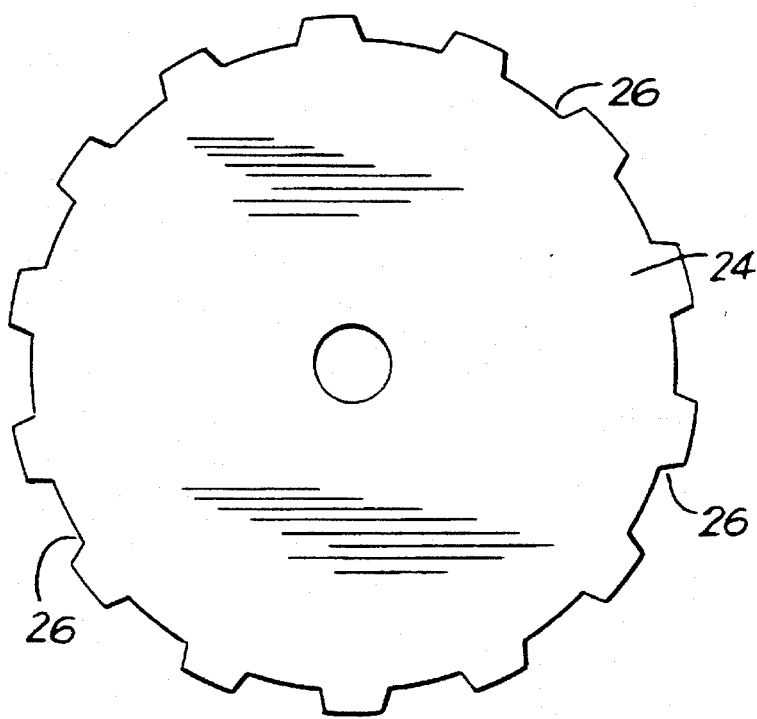
FIG. 3 is a cross-sectional view of the rotary drum of the apparatus of FIGS. 1 and 2, taken along line A—A (as shown in FIG. 2).
Figure 4:
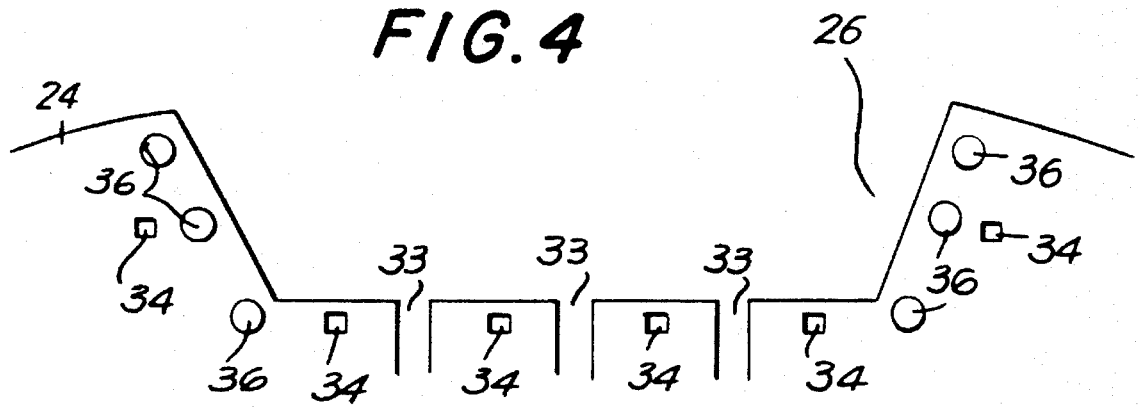
FIG. 4 is an enlarged view of a cross section of a cavity in the rotary drum as shown in FIG. 3.

In operation the drive chain is moved at a speed suitable to cause the drum 24 to rotate at the desired rate. PET sheet (not shown for the sake of clarity) is fed from roll 22 onto drum 24. As is illustrated in FIG. 3, the cylindrical face of drum 24 has cavities 26 which open on the cylindrical surface and project inwardly toward the longitudinal axis of the drum. These cavities are appropriately shaped to correspond to the desired configuration of the article to be produced, in this case a container for filling with food. The sheet is drawn over cavities 26 in drum 24, and PET material of the sheet is forced into the cavities, thereby to form integrally within the sheet the desired article of manufacture, typically a container as discussed above. As shown in FIG. 4, each cavity 26 is equipped with one or more ports 33 through which a vacuum can be drawn under the PET sheet. When a vacuum is exerted on the sheet, the sheet is drawn into the cavity. This is possible because the sheet is, as previously explained, maintained in its thermoformable plastic state throughout the entire operation, including through formation on the rotary drum. While the PET material resides in the cavity, it is heated to an appropriate temperature to induce the desired amount of crystallization, normally at least about 20%. Heating is effected by passing hot oil through passages 34 provided in the body of drum 24. Additionally, the body of drum 24 is equipped proximate each cavity 26 with electrical heating elements 36 positioned to supply additional heating to the PET material drawn into the cavity, at locations where the wall thickness of the PET material is greater. By this measure, a uniform crystallization throughout the PET material is achieved. Thus as can be seen in FIG. 2, heating oil is conducted to rotary drum 24 through passage 38 and removed through passage 40. As also there shown, the apparatus is provided with rotary slide valve 42 which is adapted to pull a vacuum on cavities 26 when the drum face first contacts the PET sheet (at the top of drum 24) to force PET material into them, and to cease the exertion of a vacuum on such cavities as they near the bottom of the drum in connection with disengagement of the sheet.

After the PET material in cavities 26 has been sufficiently heated to impart the desired degree of crystallinity (as mentioned above, the time of heating is, practically speaking, determined by the speed of revolution of the drum about its longitudinal axis), the rotation of the drum carries the PET material—which is now in the form of a sheet with the desired articles formed integrally therein—into cold box 44. In this zone, the PET material is exposed to a cold water fog or mist, and optionally blown cold air, in order to assist in the cooling of the shaped PET material. Next, the shaped material is rotated through an air-drying box 46. At this point, rotary slide valve 42 interrupts the exertion of vacuum pressure on the cavities rotated through zone 46, and rotary slide valve 50 permits air to be blown through the lower ports of the cavities in this vicinity. The air blown into such cavities aids in the disengagement of the PET sheet from the drum 24.

After disengagement from drum 24, the sheet is engaged at its lateral edges by twin-belt conveyors 48 and 49. The sheet conveyors are disposed to grip the sheet at each lateral edge by engagement with a conveyor belt both above and below each edge. By this means, the sheet is appropriately tensioned to the desired level by adjusting belt speed and spread. As also shown, twin belt arrangement 48 is angled slightly to the left of the direction of movement of the sheet and twin belt 49 is angled slightly to the right of the direction of movement of the sheet. This arrangement causes the imposition of lateral tension on the sheet which has the effect of stablizing it and preventing distortion. The height of each of the upper belts is adjustable so that the grip on the sheet (and thus the tensioning pressure on it) can be varied. Air cylinder 52 drives the raising and lowering of those upper belts in conventional manner.

Accordingly, the present invention provides a shaped article of PET having the desired degree of crystallinity uniformly exhibited throughout each such article, and from article to article. The impact resistance of those shaped articles is conveniently controlled and uniformly good because of the elimination of both excessive crystallization and insufficient crystallization. This is accomplished through the utilization of a process and apparatus which eliminate the necessity of reheating PET material between the time of sheet formation and shaped article-formation, and the provision of means by which the amount of heating can be varied from location to location within each shaped article to induce a uniform degree of crystallinity regardless of variations from location to location in the wall thickness of the shaped article. Furthermore, the invention confers the highly advantageous result that distortion of the product is significantly reduced or eliminated by virtue of the application of longitudinal and lateral tensioning during cooling after product formation. As such, the invention is a significant advance in the art.

The terms and expressions employed herein are used as terms of description and not of limitation, and there is no intention in the use of such terms and expressions of excluding any equivalents of the features shown and described or portions thereof, its being recognized that various modifications are possible within the scope of the invention.

What is claimed is:

1. Apparatus for producing an ovenable, shaped article of polyethylene terephthalate, which comprises means for heating the polyethylene terephthalate to a temperature at which it is in a thermoformable plastic state;

means for forming the polyethylene terephthalate in its thermoformable plastic state into a sheet;

means for locally cooling a surface of said sheet of polyethylene terephthalate still in its thermoformable plastic state, thereby to form a skin on said surface while maintaining the sheet as a whole in the thermoformable plastic state;

means for forming polyethylene terephthalate material of said sheet into a shaped article while maintaining said material in said thermoformable plastic state;

means for additionally heating the polyethylene terephthalate after formation of said shaped article, while it is still in the thermoformable plastic state, to impart thereto a degree of crystallinity of at least about 20%; and means for laterally and longitudinally tensioning the polyethylene terephthalate sheet containing said shaped articles after said sheet is removed from said forming means to prevent distortion during cooling.

2. Apparatus for producing an ovenable, shaped article of polyethylene terephthalate from a sheet of polyethylene terephthalate in its thermoformable plastic state, which comprises means for locally cooling a surface of said sheet of polyethylene terephthalate still in its thermoformable plastic state, thereby to form a skin on said surface while maintaining the sheet as a whole in the thermoformable plastic state;

means for forming polyethylene terephthalate material of said sheet into a shaped article while maintaining said material in said thermoformable plastic state;

means for additionally heating the polyethylene terephthalate after formation of said shaped article, while it is still in the thermoformable plastic state to impart thereto a degree of crystallinity of at least about 20%; and means for laterally and longitudinally tensioning the polyethylene terephthalate sheet containing said shaped articles after said sheet is removed from said forming means to prevent distortion during cooling.

3. Apparatus as defined in claim 1 or 2, wherein said means for forming polyethylene terephthalate material into a shaped article comprises substantially cylindrically shaped rotary drum means, the cylindrical surface of which is disposed to receive said skin-bearing sheet of polyethylene terephthalate, said rotary drum means having a plurality of cavities shaped in correspondence with said shaped article, said cavities being equipped with means to force material of said sheet received by said surface into said cavities, thereby to form shaped articles in said sheet.

4. Apparatus as defined in claim 3, wherein said means for additionally heating the polyethylene terephthalate forming said shaped articles is located within said cavities in said rotary drum means to provide direct heat transfer contact between said cavities and the polyethylene terephthalate thereby to heat and impart said degree of crystallinity to the polyethylene terephthalate while it resides in said cavities.

5. Apparatus as defined in claim 4, which further comprises means for cooling said sheet while it is still in contact with the sheet-receiving surface of said rotary drum means.

* * * * *